US011022445B2

(12) United States Patent
Morcom et al.

(10) Patent No.: US 11,022,445 B2
(45) Date of Patent: Jun. 1, 2021

(54) SEGMENTED PATH COORDINATE SYSTEM

(71) Applicant: HERE Global B.V., Eindhoven (NL)

(72) Inventors: Charles Morcom, Chicago, IL (US); David Doria, Oak Park, IL (US)

(73) Assignee: HERE Global B.V., Eindhoven (NL)

(*) Notice: Subject to any disclaimer, the term of this patent is extended or adjusted under 35 U.S.C. 154(b) by 144 days.

(21) Appl. No.: 16/216,491

(22) Filed: Dec. 11, 2018

(65) Prior Publication Data

US 2020/0182627 A1 Jun. 11, 2020

(51) Int. Cl.

| | |
|---|---|
| G01C 21/32 | (2006.01) |
| G06T 7/73 | (2017.01) |
| G01S 17/89 | (2020.01) |
| G01S 19/48 | (2010.01) |
| G06F 16/29 | (2019.01) |
| G01S 17/931 | (2020.01) |

(52) U.S. Cl.
CPC .............. *G01C 21/32* (2013.01); *G01S 17/89* (2013.01); *G01S 17/931* (2020.01); *G01S 19/48* (2013.01); *G06F 16/29* (2019.01); *G06T 7/73* (2017.01); *G06T 2207/10028* (2013.01); *G06T 2207/30244* (2013.01); *G06T 2207/30252* (2013.01)

(58) Field of Classification Search
USPC ......................................................... 701/446
See application file for complete search history.

(56) References Cited

U.S. PATENT DOCUMENTS

| | | | |
|---|---|---|---|
| 9,612,123 B1* | 4/2017 | Levinson | ................ B60Q 1/525 |
| 9,857,876 B2 | 1/2018 | Hare et al. | |
| 10,684,131 B2* | 6/2020 | Rochan Meganathan et al. ......... G06F 16/29 |
| 2015/0123995 A1 | 5/2015 | Zavodny | |
| 2017/0248963 A1* | 8/2017 | Levinson | ................ B60Q 9/008 |
| 2019/0204089 A1* | 7/2019 | Rochan Meganathan et al. ......... G01S 7/003 |
| 2020/0167934 A1* | 5/2020 | Bacchus | ................ G06T 7/246 |

FOREIGN PATENT DOCUMENTS

| | | |
|---|---|---|
| DE | 102015221626 A1 | 5/2017 |
| WO | WO2010136586 A1 | 12/2010 |
| WO | WO2018060313 A1 | 4/2018 |

OTHER PUBLICATIONS

Durić, Zoran, Azriel Rosenfeld, and Larry S. Davis. "Egomotion analysis based on the Frenet-Serret motion model." International Journal of Computer Vision 15.1-2 (1995): 105-122.
Frenet-Serret Formulas. Accessed: Nov. 1, 2018, en.wikipedia.org/w/index.php?title=Frenet-Serret_formulas&oldid=862709085.
Héry, Elwan, Philippe Xu, and Philippe Bonnifait. "Along-track localization for cooperative autonomous vehicles." Intelligent Vehicles Symposium (IV), 2017 IEEE. IEEE, 2017.

(Continued)

*Primary Examiner* — Tyler D Paige
(74) *Attorney, Agent, or Firm* — Lempia Summerfield Katz LLC

(57) ABSTRACT

A method for constructing a coordinate system relative to a vehicle traveling along a path includes receiving location data, dividing the path into path segments, matching a portion of the location data to a path segment, and determining a registration of the portion of the location data relative to the path segment. The registration may be organized by non-cartesian coordinates relative to a path point lying on the path segment.

18 Claims, 9 Drawing Sheets

(56) References Cited

OTHER PUBLICATIONS

Pilté, Marion, Silvère Bonnabel, and Frédéric Barbaresco. "Tracking the Frenet-Serret frame associated to a highly maneuvering target in 3D." Decision and Control (CDC), 2017 IEEE 56th Annual Conference on. IEEE, 2017.

European Search Report for European Patent Application No. 19214996.1-1001 dated May 8, 2020.

* cited by examiner

SEGMENTED PATH COORDINATE SYSTEM

FIELD

The following disclosure relates to a coordinate system for registering location data relative to a vehicle path.

BACKGROUND

The Global Positioning System (GPS) or another global navigation satellite system (GNSS) provides location information to a receiving device anywhere on Earth as long as the device has a substantial line of sight without significant obstruction to three or four satellites of the system. GNSS systems operate in an absolute coordinate system. That is the coordinate system is a "true Earth" system that defines points in absolute terms (latitude, longitude, and altitude) with respect to the Earth. However, some functions that rely on GNSS require complex calculations because of the coordinate system that is global or true Earth based. For example, autonomous vehicles travel along a path and may use sensors to identify features in the environment around the vehicle. In the process of localization, the features in the environment are matched to corresponding features on a map in order to determine location.

Problems arise in performing calculations relative to the collection vehicle or the path traveled by the collection vehicle. The calculations are more complex than necessary and the use of processing resources is inefficient.

SUMMARY

In one embodiment, a method for constructing a coordinate system relative to a vehicle traveling along a path includes receiving location data, dividing the path into one or more path segments, matching a portion of the location data to a path segment of the one or more path segments, and determining a registration of the portion of the location data relative to the path segment.

In another embodiment, a vehicle ranging system includes a ranging data interface configured to receive location data, a vehicle path processor configured to divide a path of the vehicle into one or more path segments, and a ranging data processor configured to match a portion of the location data to a segment of the one or more path segments and determine a registration of the portion of the location data relative to the path segment.

In another embodiment, a non-transitory computer-readable medium includes instructions that when executed by a processor are operable to receive location data, divide a vehicle path into one or more path segments; match a portion of the location data to a path segment of the one or more path segments, and determine a registration of the portion of the location data relative to the path segment, where the location data and the portion of the location data are organized by local coordinates, geographic coordinates, geocentric coordinates, or cartesian coordinates.

BRIEF DESCRIPTION OF THE DRAWINGS

Exemplary embodiments of the present invention are described herein with reference to the following drawings.

DETAILED DESCRIPTION

During localization and other tasks in automated driving and object detection, a calculation may involve performing a calculation relative to a road or path of a vehicle. For example, where a vehicle is recording ranging data along a road, an autonomous driving task may require extracting all ranging data within 2 meters of a surface of the road. Performing path-relative calculations in "true earth" (e.g. latitude, longitude, and height) coordinates or local tangent plane Cartesian coordinates may be time and resource intensive.

A coordinate system defined for a vehicle path relative to which features in the environment around the path are more covariant may facilitate such path-relative calculations. In physics and geometry, a Frenet-Serret (FS) frame describes a location in coordinates relative to a smooth curve. However, the FS frame is not adapted to real-world paths that are often not smooth. In the case that a path is straight, a normal vector component of the FS frame is undefined because there is no curvature. Similarly, in the case that a path is flat, a bi-normal component of the FS frame is undefined because there is no torsion. Further, because a real-world path may contain both left-handed and right-handed curves (e.g. s-bends in a road), the axis of the normal vector in the FS frame may change polarity through the curves, leading to inconsistent registration of objects within the FS frame.

Another coordinate system for localization on a vehicle path is the segmented path coordinate system (SPCS), which uses a non-Cartesian coordinate system defined relative to a path. SPCS is segmented because it may rely on a piecewise-linear or other approximation of the path. Further, SPCS may be defined relative to the path using three vectors: a tangent vector, a normal vector, and a binormal vector.

Figure 1:
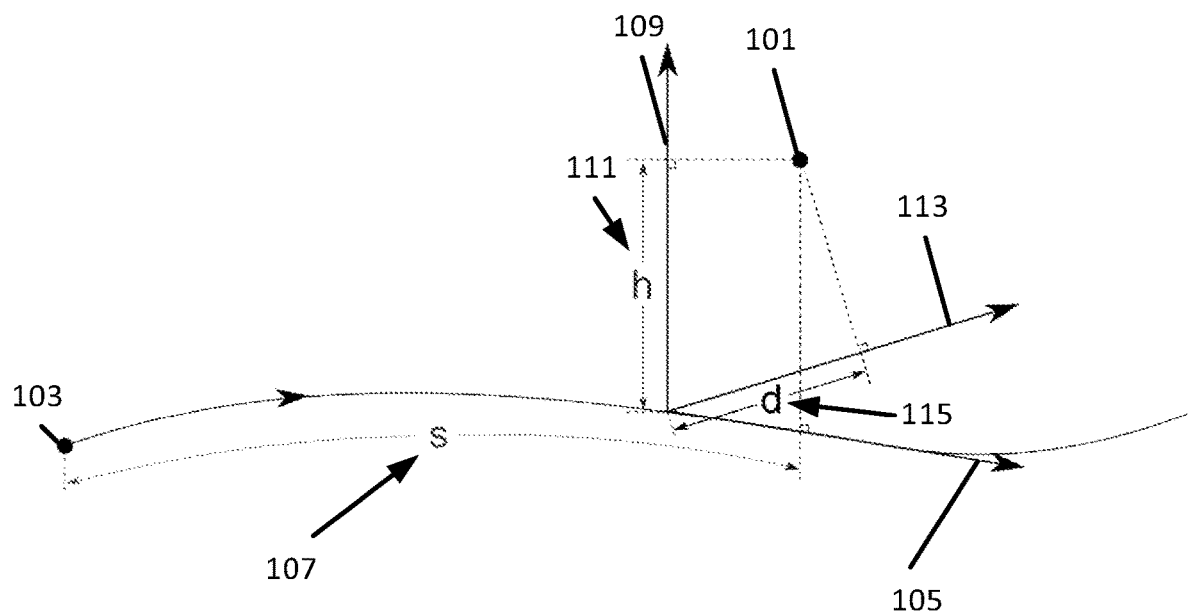
FIG. 1 illustrates an example registration for a point along a path.

FIG. 1 illustrates an example registration for a point 101 along a path 103. The registration may include or be based on a tangent vector 105, a normal vector 113, a binormal vector 109, or combinations thereof. Together, the tangent vector 105, the normal vector 113, and the binormal vector 109 are the orthonormal vectors that form the basis of the SPCS. The SPCS coordinates of the point 101 may contain a distance 107 along the path, s, a distance 115 lateral to the path, d, and a distance 111 above the path, h.

The point 101 may represent a location in space. In some cases, the point 101 may be a ranging data point. For example, a light detection and ranging (lidar) device may collect ranging data including the point 101. The point 101 may be one of a plurality of lidar ranging data points in a point cloud. In some other cases, the point 101 may be part of location data generated by another sensor such as a sonar sensor, a proximity sensor, or a global positioning sensor. The point 101 may be stored in a memory. For example, a memory of a vehicle, vehicle sensor, server, or other device may be configured to store the point 101.

The point 101 may be registered relative to the path 103. A ranging data processor of a vehicle ranging system or another processor may be configured to determine the registration. In some cases, the point 101 may have a registration relative to the path 103 including a distance 107 along the path 103, s, a transverse distance 115 from the path 103, d, and a height 111 above the path 103, h. The distance 107 along the path 103, s, may be the distance along a segment of the path 103 or the distance along an approximation of a segment of the path 103. For example, where the path 103 is represented by a linear-piecewise approximation, s may represent a distance 107 along one straight-line segment of the approximation. The transverse distance 115 from the path 103, d, may be the transverse distance to the point 101 at a distance s along the path 103. The height 111 above the path 103, h, may be the height of the point 101 with respect to the path 103. The transverse distance 115, the distance along the path or path segment 107, and the height 111 above the path may be determined by applying the Pythagorean theorem on the point 101 and a path point lying on the path. The path point may serve as the origin on the path for the orthonormal SPCS vectors. The ranging data processor or another processor may be configured to determine the distances.

The path 103 may be a path of a vehicle. For example, the path 103 may represent a path 103 taken as the vehicle traverses a road or other surface. In some cases, the path 103 may follow the surface of the ground under the vehicle. In some other cases, the path 103 may follow the position of a sensor on the vehicle as it travels through space. For example, the path 103 may represent a path 103 taken by an inertial measuring unit (IMU), a lidar sensor, or another sensor. The path 103 may follow a standard offset from one or more sensors. For example, the path 103 may be set below, behind, in front of, or otherwise at a predetermined distance from a vehicle sensor such as an IMU, lidar, or global positioning sensor. The path may be a collection of location or position measurements as the vehicle or vehicle sensor traverses the path. For example, the path may be a collection of discrete points that indicate the movement of the vehicle or vehicle sensor. A vehicle path processor of the vehicle ranging system may be configured to construct the path.

Where the point 101 is parameterized by a distance s along the path 103, a piecewise linear approximation of the path may be given by Equation 1:

$$C(s)=(1-\lambda(s))C_n+\lambda(s)C_{n+1} \quad \text{Eq. (1)}$$

Where $\lambda(s)$ represents a fraction of the distance from point $C_n$ to a next point on the path 103, $C_{n+1}$ and C(s) is the path segment at distance s along the path 103. The vehicle path processor may be configured to determine the piecewise linear approximation of the path. In some cases, the vehicle path processor may be configured to divide the path into segments. The dividing and the segments may be based on the piecewise linear approximation.

The tangent vector 105 (or the tangent axis 107) may be defined in a direction of the path 103. In some cases, the tangent vector 105 may represent a direction of travel of a vehicle. Where the path 103 is broken into a linear approximation, the tangent vector 105 may have constant magnitude and/or direction within the bounds of a segment of the linear approximation. The tangent vector 105 at an end of the path 103 may be given by Equation 2:

$$\hat{t}_n = \frac{C_{n+1} - C_n}{|C_{n+1} - C_n|} \quad \text{Eq. (2)}$$

The continuous tangent vector 105 at the distance $\lambda(s)$ along the path 103 may be given by Equation 3:

$$t(s)=(1-\lambda(s))\hat{t}_n+\lambda(s)\hat{t}_{n+1} \quad \text{Eq. (3)}$$

The tangent vector 105, t(s), may be normalized according to Equation 4:

$$\hat{t}(s) = \frac{t(s)}{|t(s)|} \quad \text{Eq. (4)}$$

In some cases, the tangent vector 105 may have a length equal to 1. In this way, the tangent vector 105 may be defined as a tangent to the linearized approximation of the path 103, as opposed to the path 103 itself. However, because the linear approximation may be fit to the path 103, the tangent vector 105 may also approximate an exact tangent of the path 103.

At each point along the path 103, a direction "up" may be defined. For example, an IMU may collect data representing a vertical direction at one or more points along the path 103. In some cases, the binormal vector 109 may be defined based on the vertical direction. For example, the binormal vector 109, v(s), at the distance s along the path 103 may be given by Equation 5:

$$v(s)=u(s)-(u(s)\cdot\hat{t}(s))\hat{t}(s) \quad \text{Eq. (5)}$$

Where u(s) is the up or vertical direction at the distance s along the path 103 and · is a dot product. The unit binormal vector 109, $\hat{v}$, may be defined as:

$$\hat{v} = \frac{v(s)}{|v(s)|} \quad \text{Eq. (6)}$$

The normal vector 113 may be defined as perpendicular to both the tangent vector 105 and the binormal vector 109. In some cases, the normal vector 113 may point toward the left side of the path 103 in the direction of travel along the path 103. For example, a positive portion of the normal axis 115 may extend to the left of the path 103. The unit normal vector 113, $\hat{n}(s)$, may be given by Equation 7:

$$\hat{n}(s)=\hat{v}(s)\times\hat{t}(s) \quad \text{Eq. (7)}$$

Where x is a cross product. With Equation 7, at each distance 107 s along the path 103, three orthonormal vectors $\hat{t}(s)$, $\hat{v}(s)$, and $\hat{n}(s)$, representing the unit tangent vector 105, the unit binormal vector 109, and the unit normal vector 113, respectively, may be defined. The ranging data processor may be configured to determine the orthonormal vectors for the point 101.

Though unit vector notation (e.g. use of a carrot "^" above a vector symbol) may be used to identify the normalized or unit vectors above, references herein to the tangent vector, t, binormal vector, v, and normal vector, n, without unit vector notation (e.g. without the carrot) may be references to normalized or unit vectors. For example, a reference herein to the tangent vector or "t" may be a reference to the unit tangent vector, $\hat{t}(s)$. In another example, a reference herein to the binormal vector or "v" may be a reference to the unit binormal vector, $\hat{v}(s)$. In a further example, a reference herein to the normal vector or "n" may be a reference to the unit normal vector, $\hat{n}(s)$.

In some cases, the point 101 may be recorded in non-SPCS coordinates. For example, the point 101 may be originally recorded in Cartesian coordinates with x, y, and z coordinates relative to an origin. The Cartesian coordinates of the point 101 may be converted into SPCS coordinates so that the point 101 is registered relative to the path 103. For example, given a point 101, P, having cartesian coordinates, a corresponding point C(s) on the path (or a segment of a linear approximation of the path 103) may be found such that the vector from the point 101 to C(s) is perpendicular to the tangent vector 105 at C(s). C(s) lies on a line segment from C to C+dC, where C is one of the $C_n$ segments approximating the path 103 and where $dC=C_{n+1}-C_n$. A fraction of the distance between C and C+dC may be defined as λ, such that C(λ)=C+λdC. The tangent vector 105 at the distance C+dC along the path 103 may be defined as t+dt so that at λ, t(λ)=t+λdt and the vector from the point 101 to C(λ) is perpendicular to t(λ). It follows that:

$$0=(P-C-\lambda dC)\cdot(t+\lambda dt)$$

$$0=(P_C-\lambda dC)\cdot(t+\lambda dt)$$

$$0=(P_C-\lambda dst)\cdot(t+\lambda dt)$$

$$0=t\cdot P_C+\lambda(dt\cdot P_C-dst\cdot t)-\lambda^2 dst\cdot dt$$

$$0=t\cdot P_C+\lambda(dt\cdot P_C-ds)-\lambda^2\cdot dst\cdot dt \qquad \text{Eq. (8)}$$

Where $P_C=P-C(\lambda)$. Equation 8 is a quadratic equation that may be solved for λ as follows:

$$\lambda=\frac{(ds-P_C\cdot dt)\pm\sqrt{(ds-P_C\cdot dt)^2+4(t\cdot P_C)(t\cdot dt)ds}}{-2ds(t\cdot dt)} \qquad \text{Eq. (9)}$$

Because λ is the fraction of a distance along a segment C, λ is bounded as 1≥λ≥0 and the negative root of Equation 9 is retained while the positive root is discarded. From λ, the distance along the path 103, s, can be found by C+λdC. Further, d and h may be determined by projecting $P_C$ into the plane spanned by (n(s), v(s)), so that P=C(s)+dn(s)+hv(s).

Where the SPCS coordinates of the point 101 are known, the coordinate registration of the point 101 in cartesian coordinates may be found. For example, given the set of SPCS vectors (tangent vector 105, binormal vector 109, and normal vector 113) and a triple of SPCS coordinates (s, d, and h), the corresponding Cartesian coordinates may be found by taking the coordinates of the vector P(s,d,h) toward the point 101:

$$P(s,d,h)=C(s)+dn(s)+hv(s) \qquad \text{Eq. (10)}$$

A processor of the vehicle ranging system or another processor may be configured to convert between SPCS coordinates and other coordinate systems using equations 1-10.

Figure 2A:
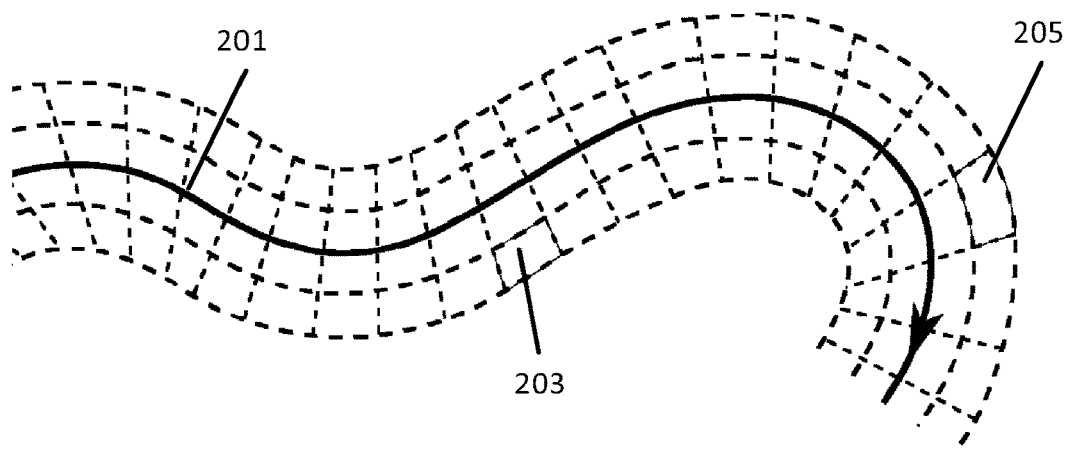
FIG. 2A illustrates an example path.
Figure 2A:
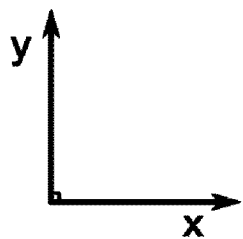

FIG. 2A illustrates an example path 201. The path 201 may be the path 103 as represented in FIG. 1. The path 201 may be a vehicle path.

Areas adjacent to the path 201 are broken into cells 203, 205. In some cases, the path 201 and the cells 203, 205 may be organized in Cartesian coordinates. The cells 203, 205 may be dimensioned with a constant distance from the path 201. For example, each cell 203, 205 may capture a predetermined (e.g., 5-meter) range extending outward from the path 201. Additionally or alternatively, the cells 203, 205 may be dimensioned with a constant width relative to the path 201. For example, each cell 203, 205 may capture a 10-meter range along the path 201.

Figure 2B:
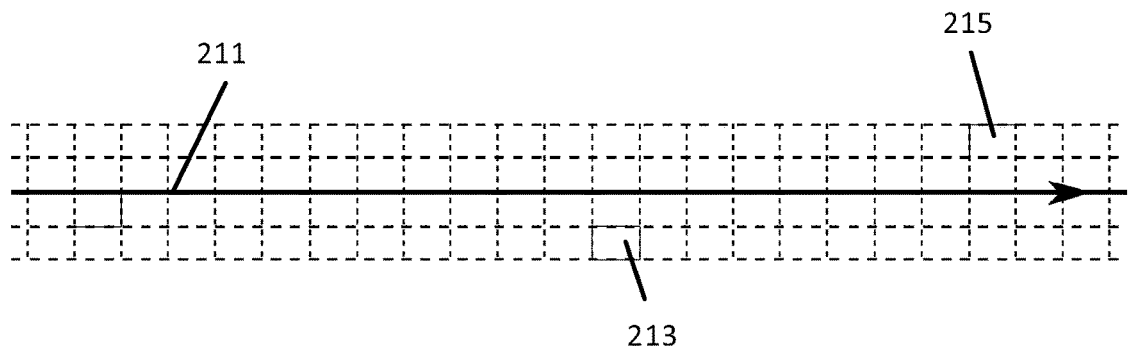
FIG. 2B illustrates an example path organized by a segmented path coordinate system.
Figure 2B:
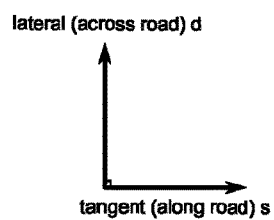

FIG. 2B illustrates an example path 211 organized by a segmented path coordinate system. By converting the car-tesian coordinates of the path 201 in FIG. 2A into path-relative SPCS coordinates, the path 201 is "straightened" or linearized into path 211. Cell 213 corresponds to cell 203 and cell 215 corresponds to cell 205.

The conversion to SPCS coordinates may reduce the complexity of certain calculations. For example, determining the time elapsed by a vehicle traveling on the path 201 between cell 203 and cell 205 may be time consuming because the path is not linear in Cartesian space. However, when converted to SPCS coordinates, the problem is simplified: there are 7 cells along the path 211 from cell 213 to cell 215. For example, where the cells are 5 meters long and the car is traveling at 10 meters per second, it is simpler to calculate in SPCS that it will take the vehicle 3.5 seconds to traverse the 35 meters between cell 213 and 215 because in cartesian coordinates, the length of the non-linear path in the x, y, and z directions may be difficult or resource intensive to calculate.

Figure 3:
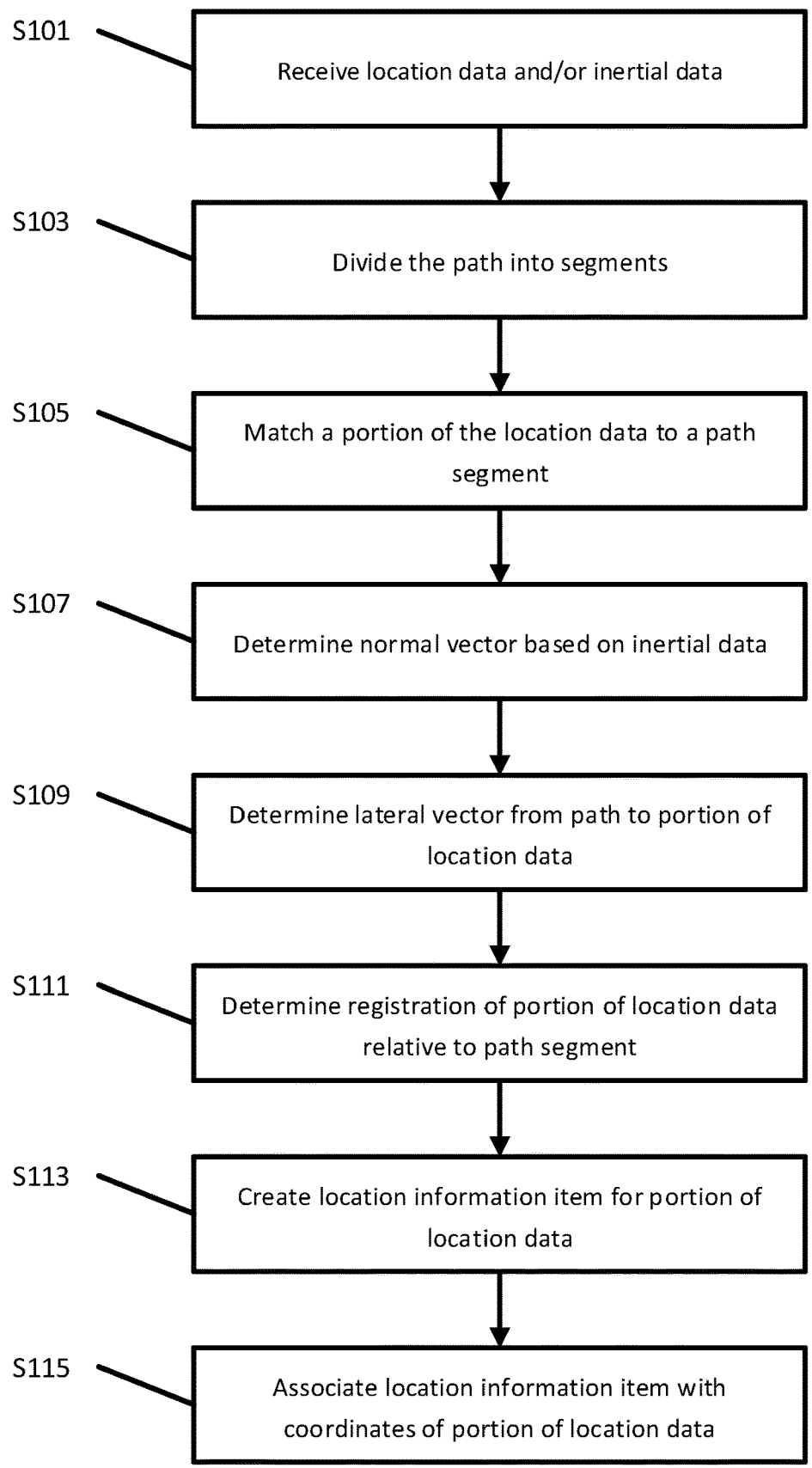
FIG. 3 illustrates an example flowchart for constructing a coordinate system relative to a vehicle traveling along a path.

FIG. 3 illustrates an example flowchart for constructing a coordinate system relative to a vehicle traveling along a path. More, fewer, or different acts may be provided. For example, step S113 may be omitted. The acts may be performed in any order. For example, act S101 may follow from act S103. In some cases, a processor may be configured to perform the acts.

In act S101, location data, inertial data, or both location data and inertial data are received. In some cases, the location data may be generated by a ranging sensor. For example, a lidar device may generate ranging data as the received location data. The location data may be a plurality of location data points in space organized into a point cloud. The location data may be organized by a coordinate system. For example, the location data may be organized by local coordinates, geographic coordinates, geocentric coordinates, or Cartesian coordinates. Local coordinates may be a system of indices in a local coordinate space different from but associated with a broader coordinate system. Geographic coordinates may be a coordinate system that describes the location of a point relative to the earth, for example, using latitude, longitude, and elevation. Geocentric coordinates may be a coordinate system representing a point in space using x, y, and z coordinates where the origin is located at the center of mass of the earth. Cartesian coordinates may be a coordinate system that specifies the location of a point uniquely in one or more planes by a set of numerical coordinates representing the distances to the point from two or more perpendicular axes defining the planes and intersecting at an origin point.

The inertial data may be generated by an inertial sensor. For example, an IMU may record inertial data of a vehicle as it traverses a path. The inertial data may include one or more of a specific force of the vehicle, an angular rate of the vehicle, and a magnetic field surrounding the vehicle. The inertial data may be used to determine an attitude or heading of the vehicle.

In act S103, a path is divided into one or more path segments. For example, a path traversed by a vehicle may be recorded (e.g. as a series of positions indicated by a positioning sensor of the vehicle) and divided into segments. In some cases, a path segment may reflect the space traversed by the path over an interval of distance or time. For example, the path segment may reflect an incorporate the actual or recorded curvature, changes in elevation, and other characteristics of the path over the interval. In some other cases, the path segment may be an approximation of the space traversed by the path over the interval. For example, the path segment may be a linear approximation of the path over the interval. Together, path segments that are approximations may form a piecewise-linear approximation of the path. The piecewise-linear approximation may be continuous across the segments of the path. In some cases, the continuous piecewise-linear approximation of the path is not smooth.

In act S105, a portion of the location data is matched to a path segment of the one or more path segments. For example, as described above with respect to FIG. 1, the portion of the location data may be matched to a segment lying from C to C+dC. The portion of the location data may be matched to a segment where a vector from a point along the segment to the portion of the location data is perpendicular to a tangent vector of the segment at the point along the segment. In some cases, the portion of the location data may be a single point in space. For example, a point of the point cloud may be matched to a segment. In some other cases, the portion of the location data may include multiple points in space. In some further cases, the portion of the location data may be matched to more that one segment. For example, where the path is curved, there may be one or more segments having points where vectors from the portion of the location data to those points is perpendicular to the tangent of the segments. Where the portion of the location data is on the inside of a curve of the path, for example, the portion of the location data may be matched to a segment at an inlet and a segment at an outlet of the curve because vectors from each segment to the portion of the location data may both be perpendicular to a tangent of each segment.

In act S107, a binormal vector may be determined based on the inertial data. For example, where the inertial data indicates a vertical direction at a path point on the matched path segment, Equation 5 may be used to determine the binormal vector based on a tangent vector at the path point (e.g. as determined based on Equation 4). The binormal vector may be perpendicular to the tangent vector.

In act S109, a lateral vector from the path point on the matched path segment to the portion of the location data is determined. The lateral vector may be perpendicular to a tangent vector at the path point on the segment. For example, the tangent vector may be determined using Equation 4 and the lateral vector may be perpendicular to the tangent vector at the path point. The lateral vector may also be called the normal vector because it may be perpendicular to both the tangent vector and the binormal vector.

In act S111, a registration of the portion of the location data relative to the path may be determined. The registration may use SPCS coordinates. For example, the registration may include or be based on one or more of a distance along the path to the path point, s, a transverse distance from the path point to the portion of the location data, d, and a height above the path point, h. In some cases, the registration may include or be based on one or more of the orthonormal SPCS vectors such as the tangent vector, the normal vector, and the binormal vector.

In act S113, a location information item is created for the portion of the location data. The location information item may be defined relative to the path segment. For example, the location information item may use the information stored in the registration such as the SPCS coordinates or orthonormal vectors. The location information item may be a label, identifier, or classification of the portion of the location information. For example, the location information item may identify the portion of the location data as belonging to a feature such as a road surface, a vehicle, a building, or a road sign. The creation of the location information item may use map-matching. For example, the path-relative registration of the portion of the location data may be compared to a location of a feature in a map that has been converted to SPCS coordinates. Where the registration of the portion of the location data corresponds to the location of the feature in the map, a location information item may be created identifying the portion of the location data as being the feature in the map.

In act S115, the location information item for the location data is associated with the coordinate system of the portion of the location data. Though the registration of the portion of the location data may use path-relative coordinates (e.g. SPCS coordinate) to make analysis easier in act S113, the location information item may also be associated with another coordinate system. For example by associating the location information item with the original coordinates of the location information prior to registration with path-relative coordinates, the location information item may be analyzed and associated with other data that is not organized relative to the path. In some cases, the location information item may be associated with local coordinates, geographic coordinates, geocentric coordinates, or cartesian coordinates of the portion of the location data. Once associated with the alternative coordinate system, the location information item may be grouped with other pieces of location information. For example, the location information item may be stored in a geographic database.

In one example, a map indicates that a feature such as a pothole is located along a vehicle path. The vehicle may traverse the path and receive location data from a lidar sensor about the surroundings of the path. The path may be broken into segments as in act S103 and location data on the surface of the road may be matched to a segment of the path as in act S105. The map may indicate that the segment of the path to which the location data was matched should have a pothole at a particular location. Once the location data has been registered relative to the path by determining the tangent, normal, and binormal vectors, as in acts S107, S109, and S111, a location information item may be determined for the location information, as in act S113. The location information item may describe the surface of the road, for example, whether there is a depression or if the road is smooth. The location information item may be compared to the map to verify that the pot hole still exists, or whether it has been filled. The location information item may be used to update the map. For example, the location information item may be converted to global coordinates and the location of the pot hole on the map can be updated. In another example, the location information item is used in autonomous driving to construct a navigation instruction to cause an autonomous vehicle to avoid the pot hole.

In another example, a map indicates that a feature such as an overpass is located along a vehicle path. The vehicle may traverse the path and receive location data from a lidar sensor about the surroundings of the path. The path may be broken into segments as in act S103 and location data for the overpass may be matched to a segment of the path as in act S105. The map may indicate that the segment of the path to which the location data was matched should have an overpass at a particular latitude, longitude, and elevation. The location data may be registered relative to the path by determining the tangent, normal, and binormal vectors as in acts S107, S109, and S111. A location information item may be determined for the location information, as in act S113. For example, when the location data matches to the overpass, a location information item such as a navigation warning may be issued to a vehicle. The navigation warning may describe that the vehicle is approaching an overpass a predetermined distance along the path. In some cases, the location information item may be a navigation command to stop the vehicle (e.g. to apply the brakes) or to pursue a different path to avoid the overpass.

In a further example, a map indicates that a feature such as a road sign is located along a vehicle path. The vehicle may traverse the path and receive location data from a lidar sensor about the surroundings of the path. The path may be broken into segments as in act S103 and the location data may be matched to a segment of the path as in act S105. The map may indicate that road signs are within a predetermined lateral distance of the path (e.g. between 1 meter and 5 meters on either side of the road) and extend above the surface of the path. Once the location data has been registered relative to the path by determining the tangent, normal, and binormal vectors, as in acts S107, S109, and S111, a location information item may be determined for the location information, as in act S113. The location information item may be a result of localization. For example, a vehicle ranging system of the vehicle may perform localization on the portion of the collected location data within the map-indicated range on the side of and above the path. The localization may identify whether or not the location data in the range represents a road sign. Because the location information is registered relative to the path, the localization does not need to be applied to all of the location data to identify a sign. Applying localization to a subset of the data may improve localization performance or reduce the computational resources needed for localization. A location information item may be determined based for the identified road sign, as in act S113. The location information item may be a speed limit, a grade level, a hazard, or other information indicated by the road sign. The location information item may be used to generate a navigation instruction, such as an autonomous driving command (e.g. slow down) or navigation warning (e.g. curves ahead).

Figure 4:
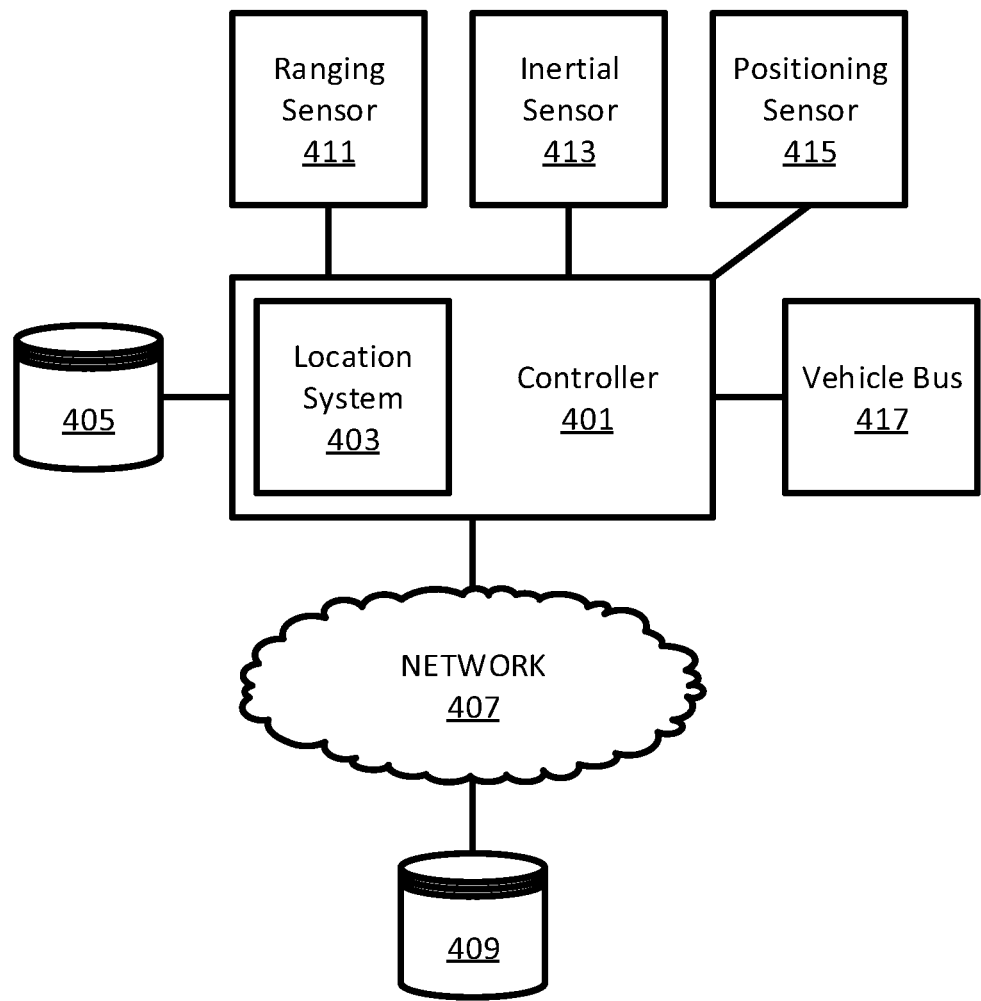
FIG. 4 illustrates an example vehicle ranging system.

FIG. 4 illustrates an example system for vehicle ranging. The system includes a controller 401 having a location system 403 and in communication with a database 405 and a network 407 through which a database 409 is accessible. The controller 401 may also be connected to a ranging sensor 411, an inertial sensor 413, a positioning sensor 415, and a vehicle bus 417. In some cases, the controller communicates with the sensors 411, 413, and 415 through the vehicle bus 417 or the network 407. More or fewer components may be provided. For example, the controller 401 may not be connected to the database 405 or 409. In another example, the controller 401 is in communication with other sensors such as a speed or steering input sensor.

The controller 401 may interface or communicate with the database 405, the network 407, the ranging sensor 411, inertial sensor 413, positioning sensor 415, and the vehicle bus 417. The connection to the network 107 may be a cellular or other wireless or wired connection. Through the vehicle bus 417, the controller 401 may communicate with other systems of the vehicle such as a motor, brakes, steering, or other systems.

The controller 401 may be located on or implemented by a vehicle such as an automobile, a boat, a train, a helicopter, an airplane, a drone, an unmanned aerial vehicle ("UAV"), or another vehicle. In some cases, the controller 401 may be implemented by a computing device in communication with the vehicle. For example, the controller may be implemented on a server remote from the vehicle and in communication with the vehicle.

The location system 403 may be configured to receive location data from the sensors 411, 413, 415 and the vehicle bus 417. The location data may be a stream of measurements of a position, a distance, an intensity, an angle, a specific force of the vehicle, an angular rate of the vehicle, and a magnetic field surrounding the vehicle or combinations thereof taken by the sensors 411, 413, 415 or the vehicle bus 417. The measurements in the location data may be in the form or order that the measurements are taken by the sensors 411, 413, 415 or the vehicle bus 417. The ranging system 403 may organize the location data into a point cloud.

The database 405 may receive and store the ranging data from the sensors 411, 413, 415 and the vehicle bus 417. Additionally or alternatively, the database 405 may receive and store one or more maps. In some cases, the maps are received from the database 409. In some other cases, the maps may be created or modified by the controller 401 or the location system 403 and stored in the database 405.

The ranging sensor 411 may be a lidar scanner or another sensor. The ranging sensor may measure a distance and an angle. For example, lidar scanners use a rotating mirror to deflect lasers in varying directions. Pulses of lasers may extend radially from the mirror of the lidar scanner. A series of one-dimensional lidar measurements may represent measurements taken as the mirror and laser pulses sweep radially through the environment. The distance to the nearest surface point along any given laser direction is obtained by firing a laser pulse and measuring its time-of-flight (e.g. the time elapsed between firing and returning to the mirror). The sequence of distance measurements obtained by a lidar scanner is thus the result of repeated distance measurements as the laser direction is varied. The lidar sensor may also measure a change in wavelength of the laser pulse from when the laser pulse was sent and when the pulse was received. Multiplying the time of flight by the speed of the laser pulse and dividing in half gives the distance from the lidar sensor to a surface that reflected the laser pulse. The measured angle may be an azimuth angle or a polar angle at which the laser pulse was sent or received by the lidar sensor. The measurements from the lidar scanner may be used to generate the location of a point in space.

The inertial sensor 413 may be an internal measuring unit (IMU) or another sensor. The inertial sensor may use one or more of an accelerometer, a gyroscope, and a magnetometer. The IMU may measure a heading or attitude of the vehicle. The heading or attitude may include a measurement of rotation around a pitch, roll, and yaw axis. From the heading or attitude, the position of the yaw axis may be determined. The yaw axis may correspond to a vertical or upward direction from the vehicle.

The positioning sensor 415 may measure a position of the vehicle. The positioning sensor 415 may be a global positioning sensor. For example, the positioning sensor 415 may operate on a network of satellites such as the global positioning system (GPS) or global navigation satellite system (GLONASS). Measurements from the positioning sensor 415 may be sued to define the path of the vehicle through space.

The vehicle bus 417 may be the internal communications network for the vehicle. The vehicle bus 417 may facilitate communication between the controller 401 and an engine control unit, transmission control unit, anti-lock braking system, or one or more body control modules of the vehicle. The vehicle bus 417 may also communicate with other sensors of the vehicle, such as radar sensors, positioning sensors, and speed sensors. In some cases, the sensors 411, 413, 415 may be connected to the bus and the controller 401 communicates with the sensors 411, 413, 415 via the vehicle bus 417.

Figure 5:
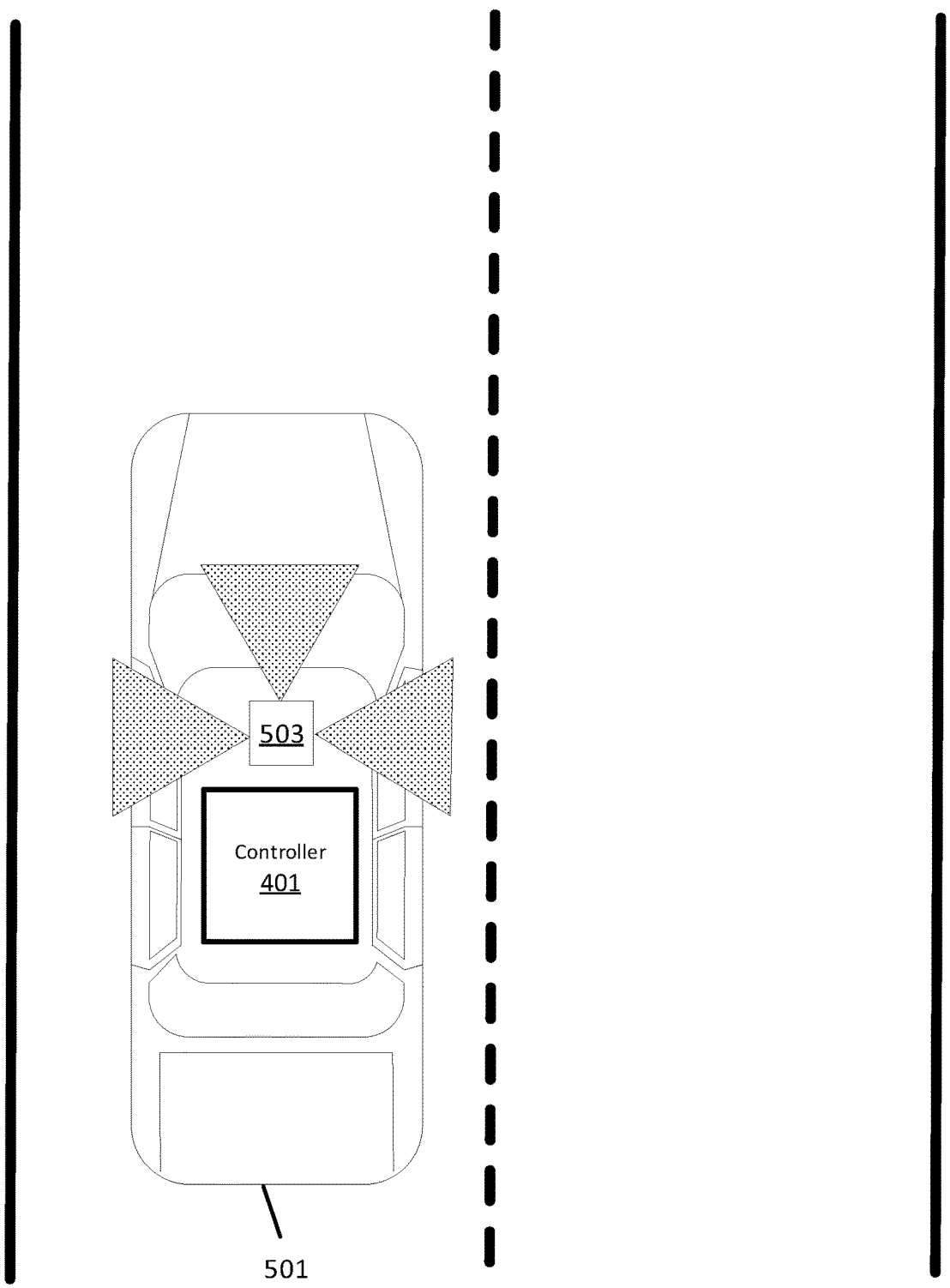
FIG. 5 illustrates another example vehicle ranging system.

FIG. 5 illustrates another example vehicle ranging system. The system may include a vehicle 501 with a sensor 503. The vehicle 501 may also include the controller 401. The vehicle 501 may be an automobile, a boat, a train, a tram, a robot, a drone, a UAV, an airplane, or another vehicle.

The sensor 503 may be supported by the vehicle 501. For example, the sensor 503 may be located on the top or front of the vehicle 501. The sensor 503 may be arranged on the vehicle 501 so that the sensor 503 has a wide view of the environment around the vehicle 501. A field of view of the sensor 503 may extend fully or partially around the vehicle 501. A portion of the field of view of the ranging sensor 503 is shown as the dotted area extending to the sides and in front of the vehicle 501. The sensor may be the network 407, the ranging sensor 411, inertial sensor 413, positioning sensor 415 of FIG. 4. The sensor 503 may be in communication with the controller 401.

Figure 6:
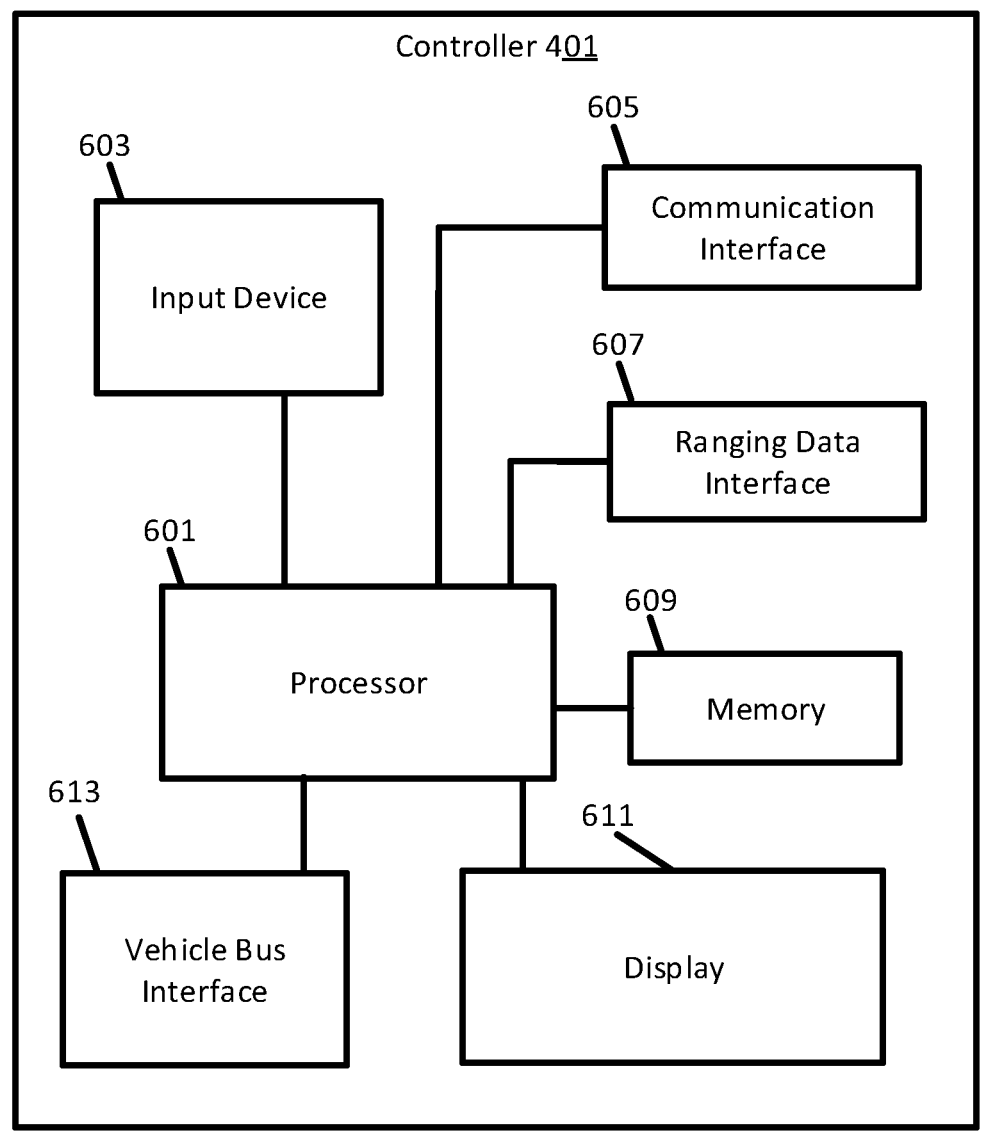
FIG. 6 illustrates an example controller for registering a point along a path.

FIG. 6 illustrates an example controller 401 for registering a point along a path. The controller may include a processor 601, an input device 603, a communication interface 605, a ranging data interface 607, a memory 609, a display 611, and a vehicle bus interface 613. Different or fewer components may be present. For example, the controller 401 may not have a display 611. In another example, the ranging data interface 607 is part of the communication interface 605.

The processor 601 may be a general processor or application specific integrated circuit. In some cases, the processor 601 is or implements a ranging data processor or pre-processor. The processor 601 may retrieve instructions from the memory 609 and execute the instructions.

The input device 603 may be used for interacting with the controller 401 or to change settings of the controller 401. For example, the input device 603 may be used to specify a speed at which the ranging sensor 411 rotates. In another example, the input device 603 may be used to specify a frequency at which laser pulses are sent by the ranging sensor 411.

The communication interface 605 may provide for the exchange of information between the controller and outside systems. For example, the communication interface 605 may be coupled with antennas for transmitting and receiving data. In some cases, the communication interface 605 forms a connection to the network 407. In this way, the communication interface 605 may allow for the exchange of data between the controller 401 and the database 409. In some other cases, the communication interface 605 may allow for data exchange between the processor 601 and sensors. For example, the communication interface 605 may allow the processor to send and receive information to and from the ranging sensor 411, the inertial sensor 413, or the positioning sensor 415.

The ranging data interface 607 may allow for the controller 401 to receive a sequence or stream of ranging measurement data from a ranging sensor. Additionally, the ranging data interface 607 may allow the controller 401 to send commands to the ranging device. In some cases, the ranging device interface may be part of or implemented by the communication interface 605 or the vehicle bus interface 613.

The memory 609 may be a volatile memory or a non-volatile memory. The memory 609 may include one or more of a read only memory (ROM), random access memory (RAM), a flash memory, an electronic erasable program read only memory (EEPROM), or other type of memory. The memory 609 may be removable from the DCP, such as a secure digital (SD) memory card. The memory 609 may store instructions to cause the processor 601 to implement the location system 403. The memory may be configured to store the series of ranging data and the ranging template.

The display 611 may be a liquid crystal display (LCD) panel, light emitting diode (LED) screen, thin film transistor screen, or another type of display. The output interface of the display 611 may also include audio capabilities, or speakers. The display 611 may indicate a status or other information about the controller 401 or the ranging sensor 411.

The vehicle bus interface 613 may provide a connection to the internal communications network for the vehicle. For example, the vehicle bus interface 613 may implement a connection between the controller 401 and the vehicle bus 413. The vehicle bus interface 613 may allow for the transfer of information between the controller 401 and one or more vehicle systems on the vehicle bus such as an engine control unit, transmission control unit, anti-lock braking system, or one or more body control modules of the vehicle.

Figure 7:
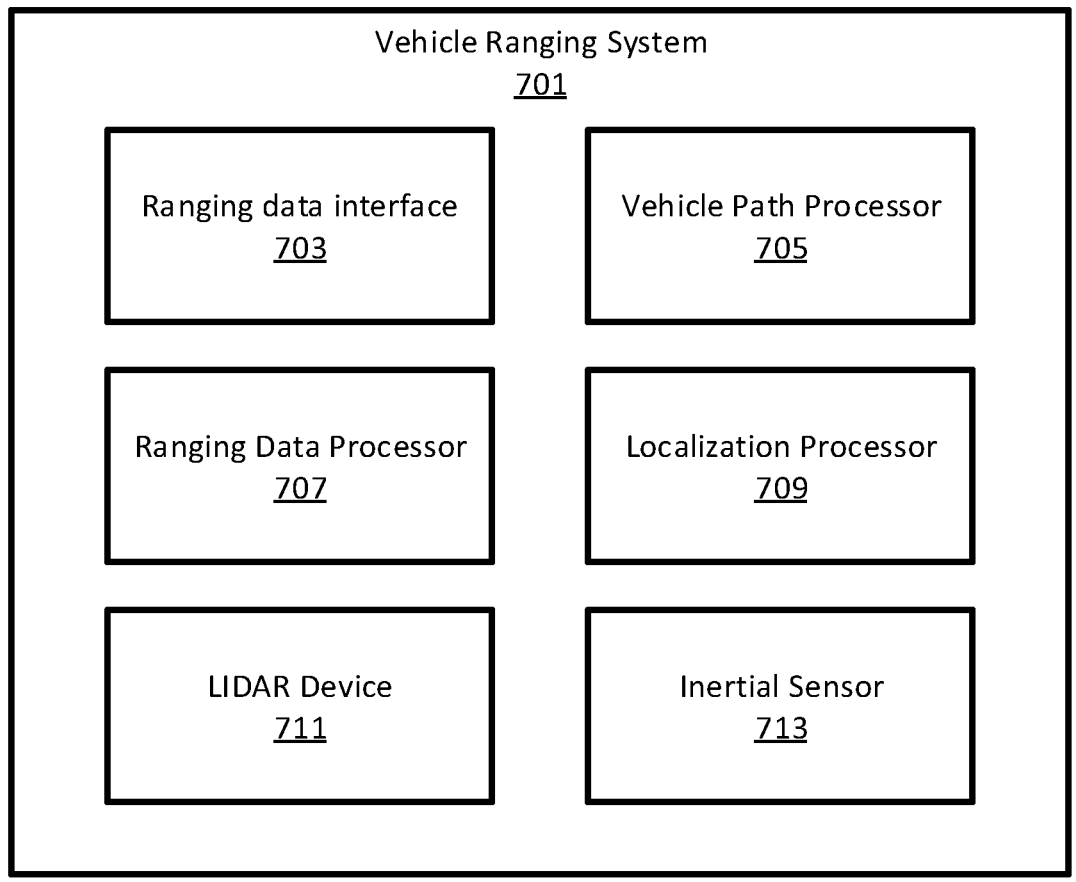
FIG. 7 illustrates a further vehicle ranging system.
Figure 8:
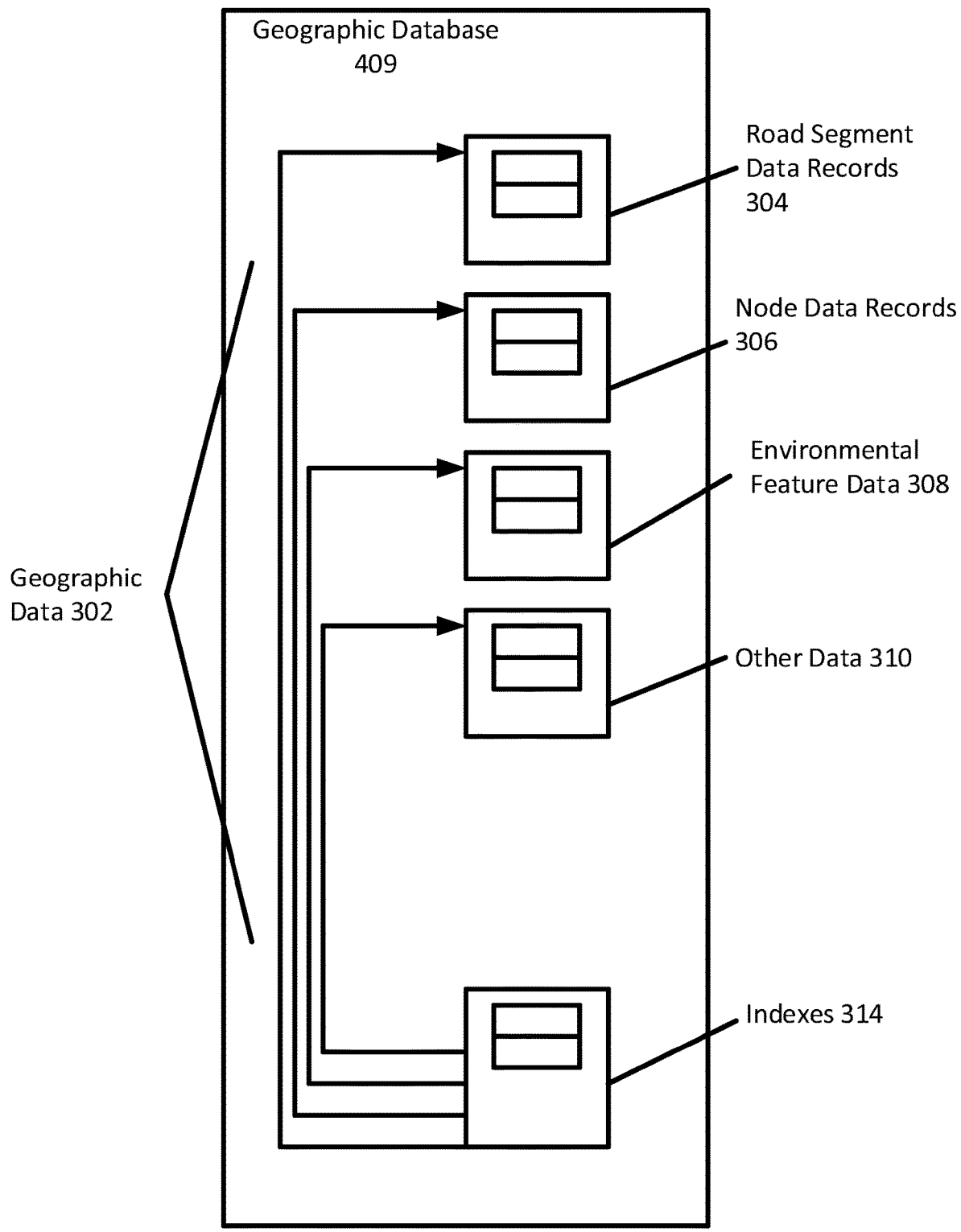
FIGS. 8 and 9 illustrate example geographic databases.

FIG. 7 illustrates a further vehicle ranging system 701. The vehicle ranging system 701 may include a ranging data interface 703, a vehicle path processor 705, a ranging data processor 707, a localization processor 709, a lidar device 711, and an inertial sensor 713. More, different, or fewer components may be provided. For example, the ranging data interface 703 may be part of another communication interface such as the communication interface 605 or the vehicle bus interface 613 of FIG. 6. The vehicle ranging system 701 may be implemented by the controller 401 of FIG. 4 or by a computing device remote to the controller 401.

The ranging data interface 703 may include or be implemented by a receiver and a transmitter. The ranging data interface 703 may be configured for digital or analog communication with one or more ranging data sensors. The ranging data interface 703 may include one or more amplifiers, digital to analog converters, or analog to digital converters.

The ranging data interface 703 may be configured to receive location data. For example, the ranging data interface may receive location data from the lidar device 711. The location data may be organized in a point cloud. For example, the location data may include a point cloud of ranging data points from the lidar device. Additionally or alternatively, the ranging data interface may provide the received ranging data points to another component for constructing a point cloud from the received ranging data points. In some cases, the ranging data processor 705 may construct the point cloud. The received location data may be organized by a coordinate system. For example, the location data may be organized by local coordinates, geographic coordinates, geocentric coordinates, or cartesian coordinates.

The vehicle path processor 705 may be a general processor or an application specific integrated circuit. The processor 705 may be the processor 601 of the controller 401. Additionally or alternatively, the processor may be a processor of a computing device remote from and in communication with the controller 401. The vehicle path processor 705 may be configured to divide a path of the vehicle into segments. In some cases, the path of the vehicle may describe the transit of the vehicle through space. In other cases, the path may describe a road or ground surface or a transit of one or more vehicle sensors. The segments may reflect the actual route of the path or may be approximations of the path. In some cases, the vehicle path processor may be configured to construct a linear-piecewise approximation of the path. The linear-piecewise approximation may be continuous along the length of the path. For example, each individual linear segments of the approximation may be continuous with neighboring segments.

The ranging data processor 707 may be a general processor or an application specific integrated circuit. The ranging data processor 707 may be configured to match a portion of the location data to a segment of the one or more path segments and determine a registration of the portion of the location data relative to the path segment. The registration may include path-relative coordinates of the portion of the location data. For example, the registration may include SPCS coordinates and vectors.

The ranging data processor 707 may be configured to match a portion of the location data to a segment of the one or more path segments. The portion of the location data may be matched to a segment where a vector from a path point on the segment to the portion of the location data is perpendicular to a tangent vector on the segment. In some cases, every path point on a particular segment may have the same tangent. The registration may include the segment or path point that was matched to the portion of the location data. In some cases, the registration may also include the tangent vector for the path point or segment.

The ranging data processor 707 may be configured to determine a normal vector of the path segment based on inertial data. For example, a vertical direction indicated by the inertial sensor 713 may be used to determine a normal vector that is perpendicular to a tangent vector at the path point. In some cases, the registration may also include the normal vector.

The ranging data processor 707 may be configured to determine a lateral vector from the path point to the portion of the location data. The lateral vector may be determined such that the lateral vector is perpendicular to both the tangent vector and the normal vector. In some cases, the registration may also include the lateral vector.

The localization processor 709 may be a general processor or an application specific integrated circuit. The localization processor 709 may be configured to create a location information item for the portion of the location data. The location information item may be base don the registration. In some cases, the location information item may be determined based on the path-relative coordinates of the registration. In some other cases, the location information item may be associated with the original coordinates of the portion of the location data. For example, where the portion of the location data was originally organized by geographic coordinates, the location information item may be determined based on the path-relative coordinates and then associated with the geographic coordinates of the portion of the location data.

The lidar device 711 may be configured to generate ranging data. The lidar device may be the ranging sensor 411. The ranging data may measure the distance, position, or location of features in the environment around the path or vehicle.

The inertial sensor 713 may be configured to generate inertial data. The inertial sensor 713 may be the inertial sensor 413. In some cases, the inertial sensor 713 is an IMU.

In FIG. 7, the geographic database 409 may contain at least one road segment database record 304 (also referred to as "entity" or "entry") for each road segment in a particular geographic region. The geographic database 409 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 409 may also include location fingerprint data for specific locations in a particular geographic region. The road segments, nodes, and other features in the database 409 may be stored according to the segmented path coordinate system (SPCS) such that each feature includes at least one location defined by a distance along the path, a transverse distance from the path, and a height above the path.

The geographic database 409 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 409 also includes indexes 314. The indexes 314 may include various types of indexes that relate the different types of data to each other or that relate to other aspects of the data contained in the geographic database 409. For example, the indexes 314 may relate the nodes in the node data records 306 with the end points of a road segment in the road segment data records 304.

As another example, the indexes 314 may relate environmental feature data 308 describing the location of one or more objects in proximity to a road segment in the segment data records 304 or a geographic coordinate. An index 314 may, for example, store environmental feature data 308 relating to one or more locations. The environment feature data 308 for the objects may include a format for SPCS including a distance along the path, a transverse distance from the path, and a height above the path.

The geographic database 409 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 409 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 409 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 409 may include historical traffic speed data for one or more road segments. The geographic database 409 may also include traffic attributes for one or more road segments. A traffic attribute may indicate that a road segment has a high probability of traffic congestion.

Figure 9:
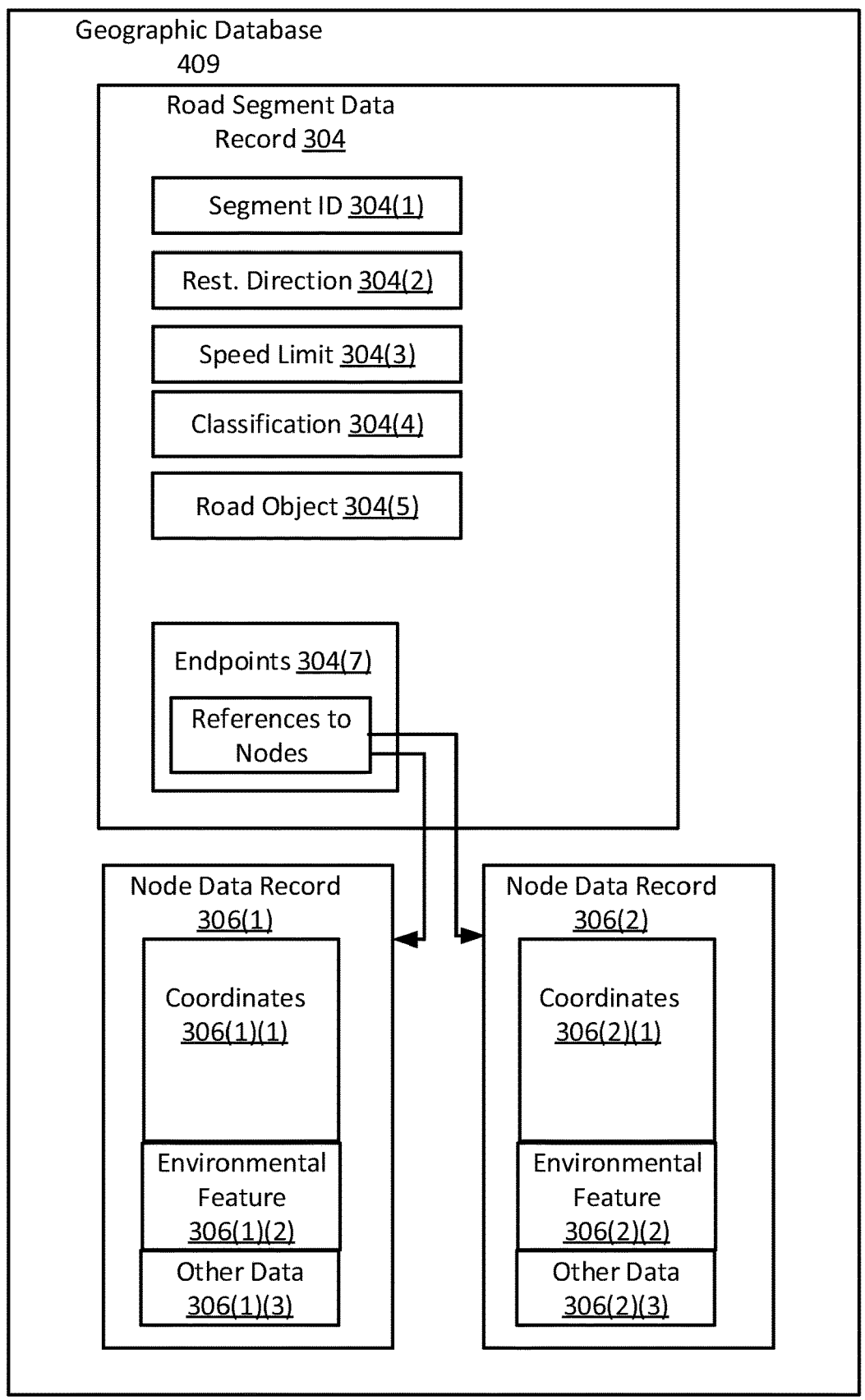

FIG. 9 shows some of the components of a road segment data record 304 contained in the geographic database 409 according to one embodiment. The road segment data record 304 may include a segment ID 304(1) by which the data record can be identified in the geographic database 409. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 409 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 409 may store information or settings for display preferences. The geographic database 409 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. In another embodiment, the data 304(7) provides SPCE coordinates for the road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 9 also shows some of the components of a node data record 306 that may be contained in the geographic database 409. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and environmental features 306(1)(2) and 306(2)(2), which may include boundaries, dimensions, or other identifiers of the environmental features. The environmental feature 306 (1)(2) and 306(2)(2) may change dynamically or over time. The node data records 306(1) and 306(2) may also include other data 306(1)(3) and 306(2)(3) that refer to various other attributes of the nodes. The environmental features 306(1)(2) and 306(2)(2) may be used for map matching with location data from a vehicle.

The geographic database 409 may be maintained by a content provider (e.g., a map developer). By way of example, the map developer may collect geographic data to generate and enhance the geographic database 409. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 409 and the data stored within the geographic database 409 may be licensed or delivered on-demand. Other navigational services or traffic server providers may access the location fingerprint data, traffic data and/or the lane line object data stored in the geographic database 409.

The controller 401 and/or processor 601 may include a general processor, digital signal processor, an application specific integrated circuit (ASIC), field programmable gate array (FPGA), analog circuit, digital circuit, combinations thereof, or other now known or later developed processor. The controller 401 and/or processor 601 may be a single device or combinations of devices, such as associated with a network, distributed processing, or cloud computing.

The memory 609 may be a volatile memory or a non-volatile memory. The memory 609 may include one or more of a read only memory (ROM), random access memory (RAM), a flash memory, an electronic erasable program read only memory (EEPROM), or other type of memory. The memory 609 may be removable from the controller, such as a secure digital (SD) memory card.

The communication interface 605 may include any operable connection. An operable connection may be one in which signals, physical communications, and/or logical communications may be sent and/or received. An operable connection may include a physical interface, an electrical interface, and/or a data interface. The communication interface 605 provides for wireless and/or wired communications in any now known or later developed format.

The databases 409 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 603 may be one or more buttons, keypad, keyboard, mouse, stylus pen, trackball, rocker switch, touch pad, voice recognition circuit, or other device or component for inputting data to the controller 401. The input device 603 and display 611 may be combined as a touch screen, which may be capacitive or resistive. The display 611 may be a liquid crystal display (LCD) panel, light emitting diode (LED) screen, thin film transistor screen, or another type of display. The output interface of the display 611 may also include audio capabilities, or speakers. In an embodiment, the input device 603 may involve a device having velocity detecting abilities.

The positioning sensor 415 may include suitable sensing devices that measure the traveling distance, speed, direction, and so on, of the vehicle 501 or the controller 401. The positioning system may also include a receiver and correlation chip to obtain a GPS signal. Alternatively or additionally, the one or more detectors or sensors may include an accelerometer and/or a magnetic sensor built or embedded into or within the interior of the vehicle 501 or the controller 401. The accelerometer is operable to detect, recognize, or measure the rate of change of translational and/or rotational movement of the vehicle 501 or the controller 401. The magnetic sensor, or a compass, is configured to generate data indicative of a heading of the vehicle 501 or the controller 401. Data from the accelerometer and the magnetic sensor may indicate orientation of the vehicle 501 or the controller 401. The vehicle 501 or the controller 401 receives location data from the positioning system. The location data indicates the location of the vehicle 501 or the controller 401.

The positioning sensor 415 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning sensor 415 may include suitable sensing devices that measure the traveling distance, speed, direction, and so on, of the vehicle 501 or the controller 401. The positioning system may also include a receiver and correlation chip to obtain a GPS signal. The vehicle 501 or the controller 401 receives location data from the positioning system. The location data indicates the location of the vehicle 501 or the controller 401.

The position sensor 415 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for constructing a coordinate system relative to a vehicle traveling along a path, the method comprising:
   receiving, by a processor, location data;
   dividing, by the processor, the path into one or more path segments;
   matching, by the processor, a portion of the location data to a path segment of the one or more path segments; and
   determining, by the processor, a registration of the portion of the location data relative to the path segment,
   wherein the registration is organized by non-cartesian coordinates relative to a path point on the path segment.

2. The method of claim 1, wherein the location data comprises a point cloud of ranging data generated by a light detection and ranging (lidar) device of the vehicle.

3. The method of claim 1, further comprising:
   receiving, by the processor, inertial data from an inertial sensor of the vehicle; and
   determining, by the processor, a binomial vector of the path segment based on the inertial data, the binormal vector being perpendicular to a tangent vector at the path point on the path segment,
   wherein the registration is based on the binormal vector and the tangent vector.

4. The method of claim 3, further comprising:
   determining, by the processor, a lateral vector from a path point on the path segment to the portion of the location data, the lateral vector being perpendicular to the tangent vector and the binormal vector,
   wherein the registration is based on the lateral vector.

5. The method of claim 1, wherein the one or more path segments are a piecewise linear fit of the path.

6. The method of claim 5, wherein the one or more path segments are continuous.

7. The method of claim 1, wherein the location data and the portion of the location data are organized by local coordinates, geographic coordinates, geocentric coordinates, or cartesian coordinates.

8. The method of claim 7, further comprising:
   generating, by the processor, a location information item for the portion of the location data relative to the path segment using the registration; and
   associating, by the processor, the location information item for the location data with the local coordinates, geographic coordinates, geocentric coordinates, or cartesian coordinates of the portion of the location data.

9. A vehicle ranging system comprising:
   a ranging data interface configured to receive location data;
   a vehicle path processor configured to divide a path of the vehicle into one or more path segments; and
   a ranging data processor configured to match a portion of the location data to a segment of the one or more path segments and determine a registration of the portion of the location data relative to the path segment,
   wherein the registration is organized by non-cartesian coordinates relative to a path point on the path segment.

10. The vehicle ranging system of claim 9, further comprising:
    a light detection and ranging (lidar) device configured to generate ranging data,
    wherein the location data comprises a point cloud of ranging data from the lidar device.

11. The vehicle ranging system of claim 9, further comprising:
    an inertial sensor configured to generate inertial data,
    wherein the ranging data processor is further configured to determine a normal vector of the path segment based on the inertial data, the normal vector being perpendicular to a tangent vector at the path point on the path segment,
    wherein the registration is based on the normal vector and the tangent vector.

12. The vehicle ranging system of claim 11, wherein the ranging data processor is further configured to determine a lateral vector from the path point to the portion of the location data, the lateral vector being perpendicular to the tangent vector and the normal vector, and wherein the registration is based on the lateral vector.

13. The vehicle ranging system of claim 9, wherein the one or more path segments are a piecewise linear fit of the path.

14. The vehicle ranging system of claim 13, wherein the one or more path segments are continuous.

15. The vehicle ranging system of claim 9, wherein the location data and the portion of the location data are organized by local coordinates, geographic coordinates, geocentric coordinates, or cartesian coordinates.

16. The vehicle ranging system of claim 15, further comprising:

a localization processor configured to create a location information item for the portion of the location data relative to the path segment using the registration and associate the location information item for the location data with the local coordinates, geographic coordinates, geocentric coordinates, or cartesian coordinates of the portion of the location data.

17. A non-transitory computer-readable medium including instructions that when executed by a processor are operable to:

receive location data;

divide a vehicle path into one or more path segments;

match a portion of the location data to a path segment of the one or more path segments; and determine a registration of the portion of the location data relative to the path segment, wherein the location data and the portion of the location data are organized by local coordinates, geographic coordinates, geocentric coordinates; or cartesian coordinates, and wherein the registration is organized by non-cartesian coordinates relative to a path point on the path segment.

18. The non-transitory computer-readable medium of claim 17, further comprising instructions that when executed by a processor are operable to:

receive inertial data from an inertial sensor of a vehicle;

determine a normal vector of the path segment based on the inertial data, the normal vector being perpendicular to a tangent vector at a path point on the path segment;

determine a lateral vector to the portion of the location data from the path point lying on the path segment, the vector being perpendicular to the tangent vector and the normal vector, wherein the registration comprises the lateral vector, the tangent vector, and the normal vector and is organized by non-cartesian coordinates relative to the path point.

* * * * *